June 17, 1947.  F. N. JACOB ET AL  2,422,303
HOLLOW MAGNETIC SHELL ASSEMBLY
Filed Jan. 27, 1945  2 Sheets-Sheet 1
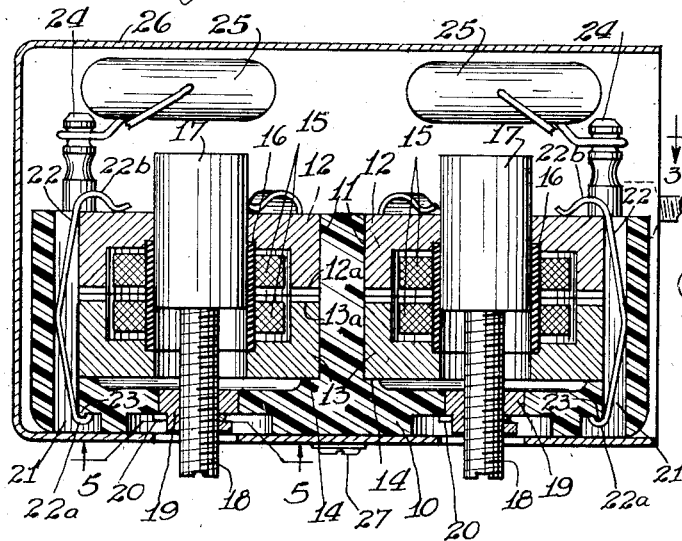
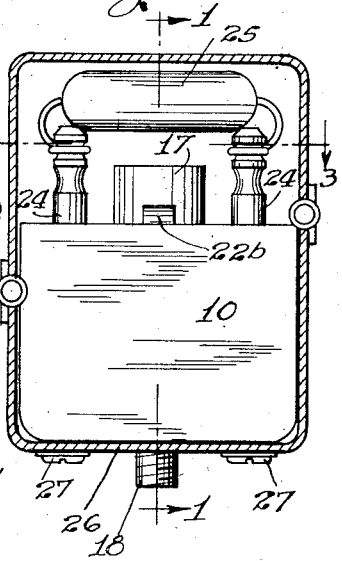
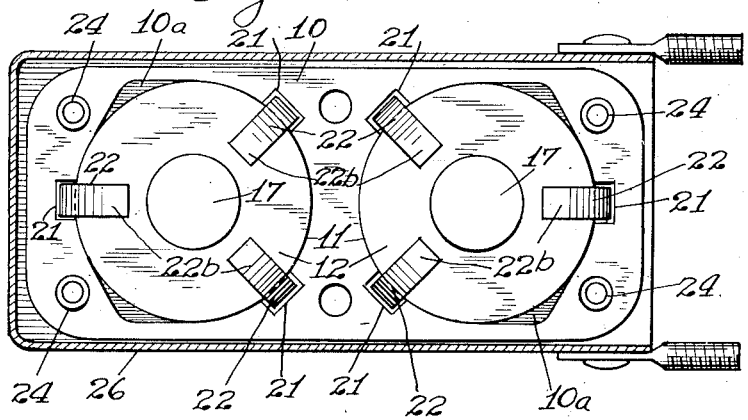
INVENTORS.
FREDERICK N. JACOB.
MARTIN J. KIRK.
BY Albert C. Bell
ATTORNEY.

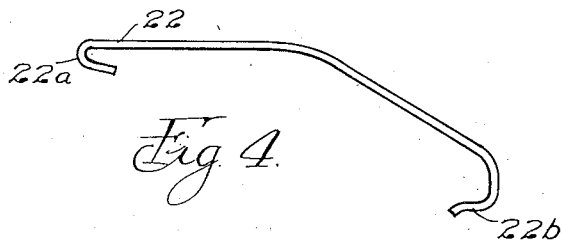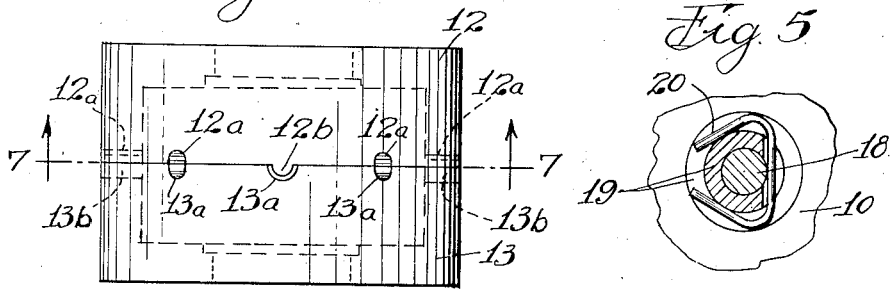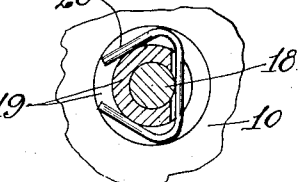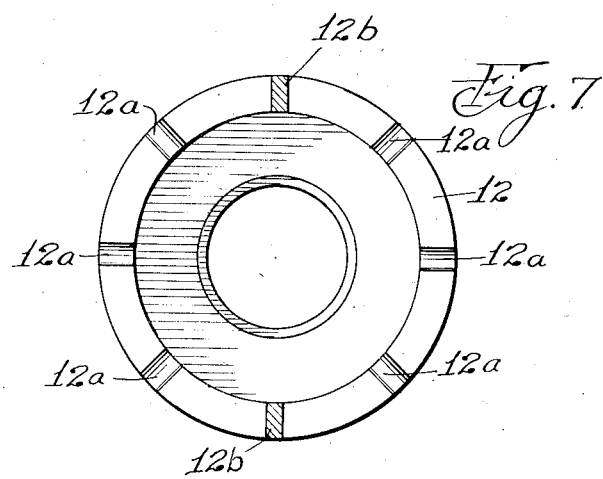

Patented June 17, 1947

2,422,303

UNITED STATES PATENT OFFICE 2,422,303

HOLLOW MAGNETIC SHELL ASSEMBLY

Frederick N. Jacob and Martin J. Kirk, Chicago, Ill., assignors to The Mantle Lamp Company of America, Chicago, Ill., a corporation of Illinois Application January 27, 1945, Serial No. 574,932

6 Claims. (Cl. 175—361)

The invention pertains particularly to assemblies of hollow magnetic shells constructed to contain inductance coils so that the coils may have nearly complete magnetic paths, the shell assemblies being preferably arranged to cooperate with movable ferromagnetic cores for tuning purposes. In connection with assemblies of this kind, the shells are made of ferromagnetic material suitable to the particular purpose of the coil and shell assemblies, and in order to mount the coils in the shells, each shell is in at least two separable parts. The invention is particularly directed to cases where shells of this kind are made of powdered iron and molded under pressure to desired form and size in suitable molds. A convenient practice is to make the shell parts of the same size and form, so that the same dies may be employed in making both of the shell parts, in which case the magnetic shell consists of two identical halves preferably meeting in a plane perpendicular to the axis of the coil and shell assembly.

As is well known in the art in making molded ferromagnetic articles from powdered iron in the manner referred to, the powdered material must be carefully weighed or otherwise measured for each article-forming operation, so that the proper quantity of ferromagnetic material may be contained in each finished article and so that the finshed article may have the desired size when taken from the forming dies. It will be appreciated that even with the most careful weighing or measuring of the quantity of powdered iron in each case, there will be unavoidable variations in the amount of the charge used in forming the successive articles by means of the dies. Although the lateral surfaces of the articles may be accurately formed by the dies, the dimensions of the articles in the same dies will vary in the direction of the applied pressure, in accordance with variations in the charges of the powdered iron employed. Various means have been proposed in the past for holding the parts of ferromagnetic shells made as described, in proper assembly so that their meeting surfaces will press firmly against each other, and so that the parts of the assemblies as a whole will be held in proper relation to each other and that the assemblies as a whole will be properly supported in or on any desired mounting members. Where lids or equivalent devices have been employed for this purpose, resilient means of some kind have been required to compensate for the irregularities in dimensions of the shell members referred to. This has led to considerable difficulty particularly in quantity production, in properly holding together the shell members that may be of larger dimensions without too loosely holding in place the shell members that may be of smaller dimensions.

By the present invention, a resilient clamping means is provided which obviates the necessity of having any holding lids or equivalent devices, and which at the same time effectively holds the shell members of the device firmly together and also holds the assembled shell members securely in place in a desired mounting member for any irregularities in dimension of the shell members that are encountered in practice, in making the shell members intended to be identical, in molds as described. By means of the resilient clamping devices of the invention, the ferromagnetic shell members may be used as they come from the forming-dies, without machining or fitting of any kind and they may be readily and quickly mounted in suitable mounting members which are preferably die-formed, without requiring any machining or fitting of the mounting members, the resilient clamping means being constructed so that the clamping means may be uniformly produced and may properly hold the parts of each shell together and may properly hold the assembled parts of the shell in place in the mounting member, regardless of variations in dimension that may be incident to the making of the shell members in the same dies.

The invention is adapted to any construction where shell members of ferromagnetic material are desired to contain inductance coils, and it is particularly advantageous in connection with coil and ferromagnetic shell assemblies constituting small inductance units for radio purposes.

The object of the invention is to produce an improved clamping and holding means for the parts of ferromagnetic shells for inductance units, which at the same time properly holds the shell and coil assemblies in place in suitable mounting members.

The invention will be best understood by reference to the accompanying drawings illustrating a preferred embodiment thereof in which:

Fig. 1 illustrates an assembly in accordance with the invention in vertical, sectional view taken along the line 1—1 in Fig. 2, excepting that in this view the capacitors and the cores are shown in side elevation, Fig. 2 is a right-hand end view of the structure illustrated in Fig. 1, Fig. 3 is a horizontal, sectional view of the assembly shown in Figs. 1 and 2, taken along the line 3—3 in Fig. 2, Fig. 4 is a view to an enlarged scale of one of the clamping springs employed to constitute the clamping and holding means of the invention, said spring in this figure being shown in its unstressed condition, Fig. 5 is a sectional detail view to an enlarged scale of a part of the construction shown in Fig. 1 taken along the line 5—5 in Fig. 1, Fig. 6 is a side elevation to an enlarged scale of two of the shell members shown in Fig. 1, illustrating their relation to each other when assembled, and Fig. 7 is a horizontal, sectional view of the structure shown in Fig. 6 taken along the line 7—7 in Fig. 6.

Similar numerals refer to similar parts throughout the several views.

As shown in Fig. 1, the illustrated assembly includes a mounting member 10, preferably of suitable insulating material such as Bakelite or similar plastic material, having cylindrical recesses or bores 11 opening through the upper surface of said member, to receive with a sliding fit the shell members 12 and 13 of ferromagnetic material, which members in their assembled relation illustrated in Fig. 1, have an axial length substantially equal to the axial length of the bores 11. The shell members 13 rest at their lower ends on seats 14 formed in the mounting member 10 to properly support the assembled shell members. The assembled shell members 12 and 13 contain inductance coils 15 mounted on coil forms 16, the ends of which coil forms enter suitable recesses therefor in the end walls of the shell members 12 and 13, to hold the coil forms in place and center them axially with the shell members. Ferromagnetic cores 17 of cylindrical form are mounted in the coil forms 16 for free sliding movement therein, the end walls of the shell members 12 and 13 having coaxial bores of substantially the same diameter as the inner diameter of the coil forms 16, so that the cores 17 may move longitudinally in the coil forms 16 and through the end walls of the shell members 12, to adjust the inductances of the inductance coils 15 as desired. Each of the cores 17 is secured to an adjusting screw 18 having threaded engagement with a metal bushing 19 rigidly mounted in the bottom wall of the mounting member 10, so that by turning the screws 18 any desired adjustment of the cores 17 may be effected. The lower portions of the bushings 19 carry spring clips 20 engaging the screws 18 to yieldingly hold the screws 18 in any desired adjustment, as more clearly shown in Fig. 5.

As more clearly shown in Fig. 3, the mounting member 10 has formed therein outside of the bores 11, angularly spaced grooves 21 parallel with the axes of the shell members and opening into said bores, and each of these grooves contains a clamping spring 22 of flat spring metal or alloy, the spring being constructed so that when it is in place as illustrated in Fig. 1, it presses the corresponding shell members 12 and 13 firmly together and at the same time firmly presses the shell member 13 against the corresponding seat 14 in the mounting member. By using a plurality of these clamping springs 22 as illustrated for each pair of shell members 12 and 13, and by spacing said clamping springs substantially uniformly as illustrated in Fig. 3, the holding pressures exerted on the shell members are distributed substantially uniformly, and as a result each pair of shell members is held together with substantially uniform pressure throughout the meeting surfaces of said shell members, and the assembled shell members are uniformly pressed against the corresponding supporting seat 14, thus holding the assembled shell members in position for effective and efficient use regardless of small variations that may occur in the axial over-all length of the assembled shell members, due to their production in dies in the manner above described. Each of the grooves 21 extends through the bottom wall of the mounting member 10, and is enlarged at its lower end below the corresponding seat 14, to accommodate the hook-shaped lower end 22a of the corresponding clamping spring 22, so that said hooked end may readily engage a lip 23 on the mounting member 10 below the seat 14, which resists radial displacement of the hooked end 22a from its clamping position. The bent upper end 22b of each clamping spring 22 extends substantially above the upper end of the corresponding shell member 12, and yields substantially when the spring is forced downwardly to engage the hooked end 22a thereof with the lip 23; the resulting stressed condition of the bent end 22b exerts the downward clamping pressure on the shell members 12 and 13 that is necessary to hold them firmly together, and at the same time to hold them firmly upon their supporting seat 14. To disassemble the shell members 12 and 13, the bent ends 22b are pressed down, and the hooked ends 22a are pressed outwardly by a suitable tool, from alignment with the lips 23, thus freeing the springs 22 for removal, after which the shell members 12 and 13 may be readily removed from the mounting member 10. The springs 22 are bent at their mid-portions to move the hooked ends 22a into alignment with the lips 23, and this also results in the springs pressing laterally against the shell members 12 and 13, thereby tending to center them in the bores 11.

The mounting member 10 is preferably provided with metal connector posts 24 rigidly embedded in the mounting member, to facilitate making the necessary connections with the coils 15 and with the conductors employed to connect the inductance units in any desired systems. Where, as is frequently the case, the inductance units are employed as parts of tuned resonant circuits, fixed capacitors 25 may be mounted above the mounting element 10 by having their conductors connected respectively with suitable ones of the connector posts 24. To facilitate connecting the coils 15 with desired ones of the posts 24, the meeting edges of the shell members 12 and 13 are preferably provided with equally spaced radial grooves 12a and 13a as shown in Figs. 6 and 7, through which the terminal wires of the coils 15 may be led, and to facilitate leading these terminal wires to desired ones of the posts 24, the mounting member 10 is preferably provided with shallow recesses 10a extending a small distance outwardlly from the bores 11, which recesses extend parallel with the axes of the bores so that the terminal wires may readily pass through said recesses. As illustrated in Figs. 6 and 7, the grooves 12a and 13a may conveniently be held in alignment with each other for the assembled condition of the members 12 and 13 by replacing one or more of the grooves 12a by a projecting lug or lugs 12b loosely entering a corresponding one or ones of the recesses 13a, and the shell member 13 may be similarly provided with one or more lugs 13b for loosely entering a corresponding one or ones of the grooves 12a.

The coil and shell assembly mounted as described in the mounting member 10, may be conveniently housed in a shield can 26 as illustrated in Figs. 1, 2 and 3; said can being provided with clearance apertures for the adjusting screws 18 so that the inductance units may be tuned from the exterior of the can, screws 27 being provided to hold the mounting member 10 in place in the can.

For many purposes it is a convenience to mount the inductance units in pairs as illustrated in Figs. 1 and 3 because of the use to which they are put in the systems in which they are employed. When mounted in this manner it will be observed that there is practically no magnetic coupling between the two units because of the nearly complete magnetic paths provided for the coils by the enclosing shell members 12 and 13. This facilitates the use of the inductance units in circuits that have no interrelation where such a condition may be desired, and on the other hand, where it is desired to employ the inductance units as parts of a coupling unit, for example as an intermediate frequency coupler, any desired coupling may be readily secured between said inductance units by suitable capacitive coupling of the circuits of the units. The construction described is adapted to a wide variety of purposes among which may be mentioned the provision of a compact means for tuning the circuits of a multi-range radio receiver, in which case one of the inductance units may be employed to tune to any desired frequency of a first band of frequencies, while the other inductance unit may be constructed and employed to tune to any desired frequency in a second and different band of frequencies. In fact the construction described may be used to advantage in any case where inductance coils are enclosed in ferromagnetic shell members substantially in the manner described. The advantage of the construction is that no thought need be given to irregularities in the dimensions of the shell members 12 and 13 which inevitably result from their being made in molds in the manner referred to, because the clamping springs 22 will compensate for any such irregularities and in any event hold the cup-shaped members tightly together and tightly against their supporting seats in the mounting member, without the use of any other fastening or securing devices, and without the use of other compensating devices of any kind. Where the inductance units are assembled in pairs as illustrated, the result is an assembly that is compact, effective and relatively inexpensive to construct.

When for any reason it is desired to disassemble the structure illustrated, the mounting member 10 and the parts mounted thereon are first removed from the shield can 26 by removing the screws 27, after which by disengaging the hooked ends 22a from the lips 23 as described, the clamping springs 22 are readily removable from the mounting member 10, and the inductance units may be easily removed from the mounting member and disassembled for any desired purpose.

It will be better appreciated that the invention described, besides securing the advantages in construction above set forth, also facilitates the production of most compact tuned inductance units, when it is understood that the structure of Figs. 1, 2 and 3, which is intended for radio purposes, is shown in said figures in substantially larger size than the full size of the actual structure, the actual external size of the shield can 26 illustrated, being substantially $1\frac{3}{16}''$ by $1\frac{9}{16}''$ by $2\frac{1}{2}''$ long.

The invention described, insofar as it pertains to the holding of the shell members together, and the holding of said assembled shell members in place in a suitable mounting member, is employed with each individual inductance unit, whether said inductance unit is provided with a unit mounting, or whether two or more of said inductance units are provided with a common mounting. Where, as illustrated, a plurality of said inductance units is mounted in a common mounting member, the advantage may frequently be had of making connections common to the several inductance units in a single shield can, thereby reducing the number of outside connecting wires.

While we have shown our invention in the particular embodiment above described, it will be understood that we do not limit ourselves thereto in carrying out our invention as we may employ equivalents thereof without departing from the scope of the appended claims.

Having thus described our invention, what we claim is:

1. In an inductance unit assembly, the combination of a mounting member having a bore therein open at its upper end and restricted at its lower end by an extension from said mounting member into said bore forming a supporting seat, a multi-part ferromagnetic shell in said bore, said shell having a cavity for containing an inductance coil, and springs means engaging said mounting member and also said shell and pressing the parts of said shell against each other and also pressing said shell against said seat, said spring means including angularly spaced clamping springs pressing downwardly against the upper end of said shell and also pressing upwardly on said mounting member below said seat, said mounting member having grooves opening into said bore and containing said clamping springs.

2. In an inductance unit assembly, the combination of a mounting member having a bore therein open at its upper end and restricted at its lower end by an extension from said mounting member into said bore forming a supporting seat, a multi-part ferromagnetic shell in said bore, said shell having a cavity for containing an inductance coil, and spring means engaging said mounting member and also said shell and pressing the parts of said shell against each other and also pressing said shell against said seat, said spring means including angularly spaced clamping springs pressing downwardly against the upper end of said shell and also pressing upwardly on said mounting member below said seat, said mounting member having grooves opening into said bore and containing said clamping springs, said shell comprising two similar cup-shaped members each including an end wall and a tubular side wall, said cup-shaped members having surfaces engaging each other at adjacent ends of their said side walls.

3. In an inductance unit assembly, the combination of a mounting member having a bore therein open at its upper end and restricted at its lower end by an extension from said mounting member into said bore forming a supporting seat, a multi-part ferromagnetic shell in said bore, said shell having a cavity for containing an inductance coil, and spring means engaging said mounting member and also said shell and pressing the parts of said shell against each other and also pressing said shell against said seat, said spring means including angularly spaced clamping springs pressing downwardly against the upper end of said shell and also pressing upwardly on said mounting member below said seat, said mounting member having grooves opening into said bore and containing said clamping springs, said shell comprising two similar cup-shaped members each including an end wall and a tubular side wall, said cup-shaped members having surfaces engaging each other at adjacent ends of their said side walls, said bore being cylindrical and closely fitting said cup-shaped members.

4. In an inductance unit assembly, the combination of a mounting member having a bore therein open at its upper end and restricted at its lower end by an extension from said mounting member into said bore forming a supporting seat, a multi-part ferromagnetic shell in said bore, said shell having a cavity for containing an inductance coil, and spring means engaging said mounting member and also said shell and pressing the parts of said shell against each other and also pressing said shell against said seat, said spring means including angularly spaced clamping springs pressing downwardly against the upper end of said shell and also pressing upwardly on said mounting member below said seat, said mounting member having grooves opening into said bore and containing said clamping springs, said shell comprising two similar cup-shaped members each including an end wall and a tubular side wall, said cup-shaped members having surfaces engaging each other at adjacent ends of their said side walls, said bore being cylindrical and closely fitting said cup-shaped members and having an enlargement longitudinally thereof to receive a connecting wire extending from a coil in said shell.

5. In an inductance unit assembly, the combination of a mounting member having a bore therein open at its upper end and restricted at its lower end by an extension from said mounting member into said bore forming a supporting seat, a multi-part ferromagnetic shell in said bore, said shell having a cavity for containing an inductance coil, and spring means engaging said mounting member and also said shell and pressing the parts of said shell against each other and also pressing said shell against said seat, said spring means including angularly spaced clamping springs pressing downwardly against the upper end of said shell and also pressing upwardly on said mounting member below said seat, said mounting member having grooves opening into said bore and containing said clamping springs, said clamping springs having hook-shaped lower ends and inwardly bent upper ends, said mounting member having projecting lips engaging said hook-shaped ends and restraining them against releasing movement.

6. In an inductance unit assembly, the combination of a mounting member having a bore therein open at its upper end and restricted at its lower end by an extension from said mounting member into said bore forming a supporting seat, a multi-part ferromagnetic shell in said bore, said shell having a cavity for containing an inductance coil, and spring means engaging said mounting member and also said shell and pressing the parts of said shell against each other and also pressing said shell against said seat, said spring means including angularly spaced clamping springs pressing downwardly against the upper end of said shell and also pressing upwardly on said mounting member below said seat, said mounting member having grooves opening into said bore and containing said clamping springs, said clamping springs having hook-shaped lower ends and inwardly bent upper ends, said mounting member having projecting lips engaging said hook-shaped ends and restraining them against releasing movement, said clamping springs being movable downwardly against the spring stress of said bent upper ends to release said hook-shaped ends from said lips.

FREDERICK N. JACOB.
MARTIN J. KIRK.

REFERENCES CITED

The following references are of record in the file of this patent:

UNITED STATES PATENTS

| Number | Name | Date |
|---|---|---|
| 946,619 | Burch | Feb. 15, 1910 |
| 977,738 | Herrick | Dec. 6, 1910 |
| 2,130,815 | Riepka | Sept. 20, 1938 |
| 640,314 | Packard et al | Jan. 2, 1900 |
| 2,158,613 | Loughlin | May 16, 1939 |
| 1,634,923 | Thullen | July 5, 1927 |
| 2,080,837 | Shrader | May 18, 1937 |
| 1,712,011 | Squire | May 7, 1929 |

FOREIGN PATENTS

| Number | Country | Date |
|---|---|---|
| 29,255 | Netherlands | Mar. 15, 1933 |